(12) United States Patent
Slaney et al.

(10) Patent No.: US 11,748,401 B2
(45) Date of Patent: *Sep. 5, 2023

(54) GENERATING CONGRUOUS METADATA FOR MULTIMEDIA

(71) Applicant: YAHOO ASSETS LLC, Dulles, VA (US)

(72) Inventors: Malcolm Slaney, Sunnyvale, CA (US); Kilian Weinberger, Mountain View, CA (US)

(73) Assignee: YAHOO ASSETS LLC, New York, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 16/281,158

(22) Filed: Feb. 21, 2019

(65) Prior Publication Data

US 2019/0179850 A1    Jun. 13, 2019

Related U.S. Application Data

(63) Continuation of application No. 12/042,306, filed on Mar. 4, 2008, now Pat. No. 10,216,761.

(51) Int. Cl.
*G06F 16/58*     (2019.01)
*G06F 16/68*     (2019.01)
*G06F 16/78*     (2019.01)
*G06F 16/583*    (2019.01)
(Continued)

(52) U.S. Cl.
CPC .......... *G06F 16/58* (2019.01); *G06F 16/5838* (2019.01); *G06F 16/68* (2019.01); *G06F 16/683* (2019.01); *G06F 16/78* (2019.01); *G06F 16/7847* (2019.01)

(58) Field of Classification Search
None
See application file for complete search history.

(56) References Cited

U.S. PATENT DOCUMENTS

| 7,043,473 | B1 * | 5/2006 | Rassool | H04N 5/913 |
| 2004/0025180 | A1 * | 2/2004 | Begeja | G06F 16/7844 725/46 |
| 2005/0193014 | A1 * | 9/2005 | Prince | G06F 16/4387 |

(Continued)

OTHER PUBLICATIONS

Marc Davis; From Context to Content: Leveraging Context to Infer Media Metadata; 2004; Multimedia '04: Proceedings of the 12th annual ACM international conference on Multimedia; pp. 188-195 (Year: 2004).*

(Continued)

*Primary Examiner* — Albert M Phillips, III
*Assistant Examiner* — Jermaine A Mincey
(74) *Attorney, Agent, or Firm* — James J. DeCarlo; Greenberg Traurig, LLP

(57) ABSTRACT

A method of generating congruous metadata is provided. The method includes receiving a similarity measure between at least two multimedia objects. Each multimedia object has associated metadata. If the at least two multimedia objects are similar based on the similarity measure and a similarity threshold, the associated metadata of each of the multimedia objects are compared. Then, based on the comparison of the associated metadata of each of the at least two multimedia objects, the method further includes generating congruous metadata. Metadata may be tags, for example.

18 Claims, 4 Drawing Sheets

(51) Int. Cl.
*G06F 16/783* (2019.01)
*G06F 16/683* (2019.01)

(56) References Cited

U.S. PATENT DOCUMENTS

| | | | | |
|---|---|---|---|---|
| 2006/0253491 A1* | 11/2006 | Gokturk | .............. | G06F 16/5846 |
| 2007/0033214 A1* | 2/2007 | Lewis | ................ | G06F 3/04817 |
| 2007/0174247 A1* | 7/2007 | Xu | ........................ | G06F 40/169 |
| 2007/0239778 A1* | 10/2007 | Gallagher | .......... | G06K 9/00221 |
| 2009/0023432 A1* | 1/2009 | MacInnis | ................ | G06F 16/48 |
| | | | | 455/418 |
| 2009/0083260 A1* | 3/2009 | Artom | ................ | G06Q 30/0264 |

OTHER PUBLICATIONS

Isaac Councill; Learning Metadata from the Evidence in an On-Line Citation Matching Scheme; 2006; JCDL; pp. 276-285 (Year: 2006).*

* cited by examiner

GENERATING CONGRUOUS METADATA FOR MULTIMEDIA

CROSS REFERENCE TO RELATED APPLICATIONS

This application is a continuation of and claims priority from co-pending U.S. patent application Ser. No. 12/042,306, filed Mar. 4, 2008, entitled GENERATING CONGRUOUS METADATA FOR MULTIMEDIA, the contents of which is hereby incorporated by reference.

BACKGROUND OF THE INVENTION

Digital photography users often use online photo-sharing sites to upload their digital photos to easily share with friends and family. Users of these photo sharing sites often generate metadata, such as tags, to describe the images that they have uploaded to the online photosharing site. Metadata, or data about an object, may include a location or time, for example. This type of user-generated content can be utilized to access other content on the Internet.

However, metadata, like tags, are indiscriminately applied, and may not accurately describe an image. For example, all photos from a user's trip to Japan during Christmas might be labeled "japan," but also "Christmas". Similarly, images that are part of a family's Christmas celebration, including an annual trip to the beach are also labeled "Christmas." These images, even with a common tag, have a good chance of not being meaningful to other users. Therefore, these tags are not reliable and congruous with the expectations of the large population of Internet users. If these tags are utilized by other users or services to generate content, the results may not be accurate.

Previously, the ESP Game was developed to test whether two different users would label and image with the same word. The ESP Game allows for two users to generate metadata for one image. This game puts an image in front of two users and then awards points to players when two players suggest the same tag to describe an image. For example, it is likely that two users shown an image of the Augsburg church will both label the image with "church." The idea of the ESP Game is that if both users use the same descriptive word for the metadata, then there is a high reliability that the metadata the two users used applies to the image.

However, it is highly unlikely that two random users from the Internet will know the location of the church and, thus, will not label the church with "Augsburg." The way these tags are generated in a multi-user game is not useful in returning images that are representative of the Augsburg church. It is more likely that the user, who is the owner of the image of the Augsburg church, would provide a more accurate description of the image.

Therefore, a method for generating congruous metadata that accurately describes similar images is desired.

BRIEF SUMMARY OF THE INVENTION

In accordance with embodiments of the present invention, a method of generating congruous metadata is provided. The method includes receiving a similarity measure between at least two multimedia objects. Each multimedia object has associated metadata. If the at least two multimedia objects are similar based on the similarity measure and a similarity threshold, the associated metadata of each of the multimedia objects are compared. Then, based on the comparison of the associated metadata of each of the at least two multimedia objects, the method further includes generating congruous metadata. Metadata may be tags, or estimates of image contents, for example.

In other embodiments of the present invention, a computer-readable medium encoded with computer instructions for generating congruous metadata is provided. The instructions include receiving a similarity measure between at least two multimedia objects. Each multimedia object has associated metadata. The instructions further include comparing the associated metadata of each of the at least two multimedia objects, if the at least two multimedia objects are similar based on the similarity measure and a similarity threshold. Then, based on the comparison of the associated metadata of each of the at least two multimedia objects, the instructions include generating congruous metadata.

In other embodiments of the present invention, a system for generating congruous metadata is provided. The apparatus includes logic for determining a similarity measure between at least two multimedia objects. Each of the at least two multimedia objects has associated metadata. Logic for comparing the associated metadata of each of the at least two multimedia objects, if the at least two multimedia objects are similar, based on the similarity measure and a similarity threshold, is also included in the apparatus. Furthermore, the apparatus includes logic for generating congruous metadata based on the comparison of the associated metadata of each of the at least two multimedia objects.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Currently, there are a huge number of images online. With so many users uploading these images and independently providing image tags, each user is an expert on the particular images that belong to them. Similarly, other multimedia, such as videos and audio files, are tagged by users.

Therefore, by utilizing the metadata that are already associated with an image in a database according to embodiments of the invention, there may be some metadata associated with a group of images that can be labeled as congruous. Metadata may be image tags, location, time, and facial identification, for example. Congruous metadata can be utilized for image searching in order to find desired images. Moreover, metadata labeled congruous can be used for automatic image classification, learning tag models, and other semantic data about accessible multimedia data.

Figure 1:
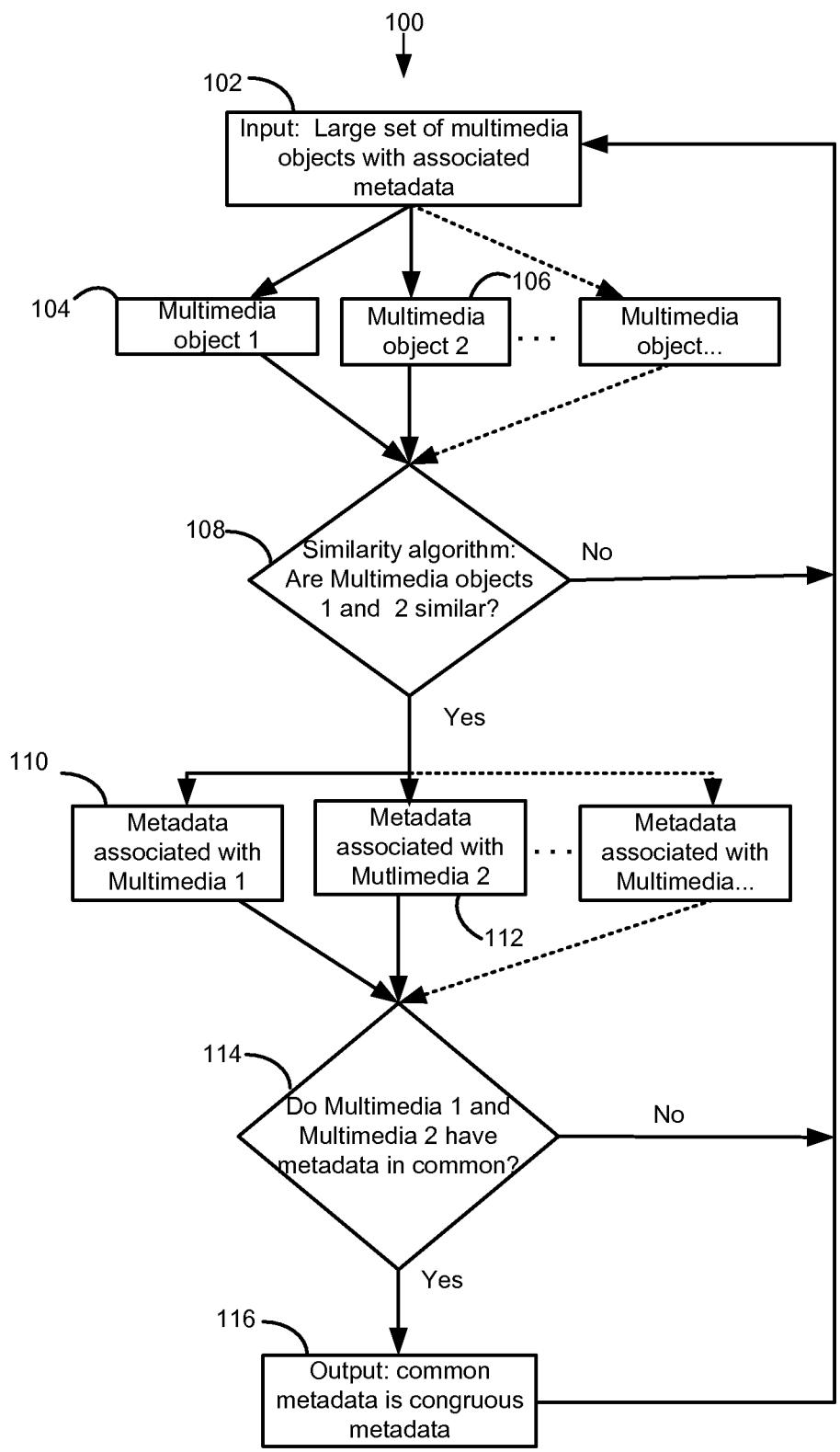
FIG. 1 illustrates a flowchart of a method for generating congruous metadata for multimedia objects according to embodiments of the invention.

FIG. 1 illustrates a flowchart of a method for generating congruous metadata for multimedia objects according to embodiments of the invention. The input to method 100 may be a large set of multimedia objects with associated metadata. Multimedia objects may be images, audio, or video, for example. The associated metadata may be tag annotations. Tag annotations are typically added by a user as a label for the multimedia objects. At least two multimedia objects 104 and 106 are selected from the large set of multimedia objects. In other words more than two multimedia objects may be selected.

In decision 108, a similarity algorithm is applied to multimedia object 1 104 and multimedia object 2 106 to determine a similarity measure. The similarity measure indicates if multimedia object 1 104 and multimedia object 2 106 are similar or dissimilar. Similarity may be determined by comparing the similarity measure with a similarity threshold. A similarity threshold may be predetermined. The similarity threshold may also be adjusted to be more or less restrictive. For example, in the case the multimedia objects are images, if the similarity threshold is more restrictive, the similarity algorithm will determine images are similar if features of the image are very similar. In some embodiments, the similarity threshold may be high, or that the degree of similarity is higher, since there may be no user actually verifying that the tags apply to a particular multimedia object.

In some embodiments, a similarity measure determines the most similar set of multimedia objects of one multimedia objects. For example, for a first multimedia object, a first set of similar multimedia objects may be determined from a similarity measure. Similarly, a second set of similar multimedia objects may be determined for a second multimedia object. If the first multimedia object is included in the second set of similar multimedia objects, and the second multimedia object is included in the first set of similar multimedia objects, it can be determined that the first and second multimedia objects are similar.

There are many well-known similarity algorithms. A similarity measure may be determined in an automated fashion, so that no user intervention is required. A color histogram, a Probabilistic Latent Semantic Analysis (PLSA), a K-nearest neighbor algorithm in pixel space, or a local invariant features algorithm, such as a Scale-Invariant Feature Transform (SIFT) algorithm can be used to determine a similarity measure, for example.

A common framework is to first represent the two instances, e.g., two images, as vectors and then use a metric to compute their pairwise distance. Representing the two instances as vectors and computing pairwise distance may be both determined in an automated fashion, so that no user intervention is required.

There are many ways to put an instance into vector representation. Images can be represented as color histograms, pixels in various color spaces or more elaborate feature representations that are extracted with specialized algorithms. Algorithms for feature extraction include Latent Semantic Analysis (LSA), Probabilistic Latent Semantic Analysis (PLSA), Latent Dirichlet Allocation, Scale-Invariant Feature Transform (SIFT), and Geometric Blur, for example. Using an like SIFT, for example, important points in an image are determined and using these points can determine the degree of similarity between the two images.

The distance metric can be a standard Euclidean metric (commonly L1, L2 or the Mahalanobis Metric) or an especially learned metric. Especially learned metrics may include Large Margin Nearest Neighbor (LMNN), Invariant Mappings based on Convolutional Neural Networks, and Linear Discriminent Analysis, for example.

Similar to image similarity algorithms, multimedia, such as audio and video, may be compared with similarity algorithms. However, determining video and audio similarity is difficult because the time-course of the signal can be altered and it can still convey the same message.

For example, but not limited to, video similarity can be judged by first creating a "video mosaic". In a video mosaic, a video shot is summarized by creating a single wide-view image showing everything that the camera sees as it pans over the scene. This may be done by aligning portions of each new image with the existing mosaic, thus extending the mosaic to cover larger and larger regions of the original scene. In this way, a video-similarity problem because similar to an image-similarity problem.

Similarly to video, audio signals have a similar problem in that it is a signal over time. However, unlike video, there is no easy static representation that shows the entire signal. For example, instead by generating cover-song detection to find short snippets—shingles—that are similar in the query signal and the database can determine audio similarity. Using locality-sensitive hashing techniques this audio similarity problem can be solved in highly efficient manner.

The similarity of two audio signals can be measured by converting the audio waveforms into a feature space such as linear-predicted coding (LPC) or MFCC (mel-frequency cepstral coefficients). The MFCC coefficients represent the broad spectral shape of the audio signal over short (i.e. 20 ms) windows of the signal. By calculating the sum over time of the Euclidean distance between two time-varying signal representations, one can make an elementary distance calculation. A better measure of the similarity of two signals is found by allowing for small changes in the speed of one or the other signals. This can be done using an algorithm known as dynamic-time warping.

With reference to FIG. 1, if it is determined that multimedia object 1 104 and multimedia object 2 106 are not similar by the similarity algorithm, then two other multimedia objects are selected from the group to compare.

However, if it is determined that multimedia object 1 104 and multimedia object 2 106 are similar by the similarity measure resulting from the similarity algorithm, then the associated metadata 110 of multimedia object 1 and the associated metadata 112 of multimedia object 2 are compared to find common metadata of the two multimedia objects. The metadata may be tag annotations. The metadata may include time or location indications, for example.

Figure 2:
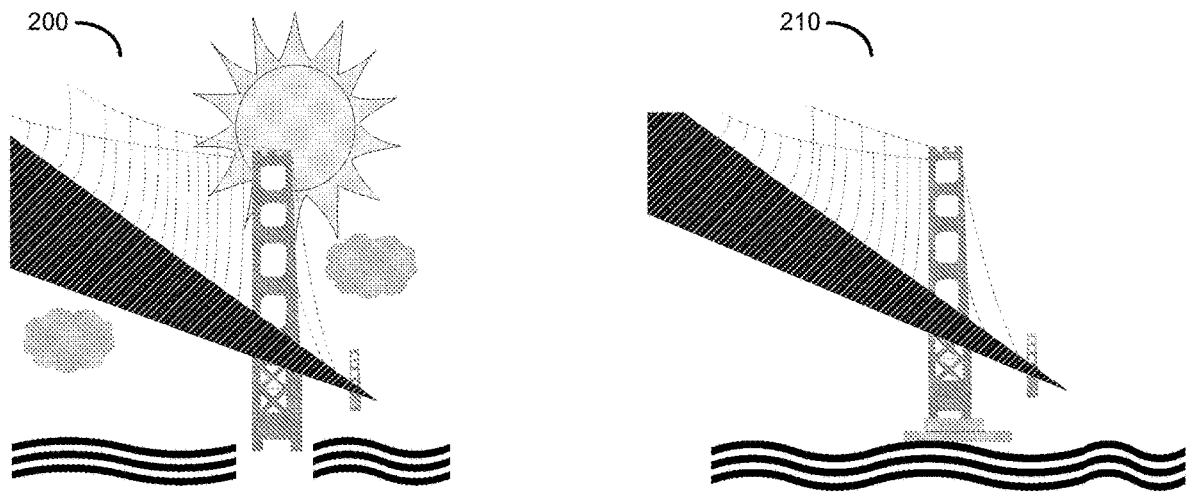
FIG. 2 illustrates an example of two images that may be used to generate congruous metadata according to embodiments of the invention.

FIG. 2 illustrates examples of two images that may be selected to determine any congruous metadata. Image 200 and image 210 both show images of the Golden Gate Bridge in San Francisco. However, the associated metadata, or tags, are not all shared by both images.

Figure 3:
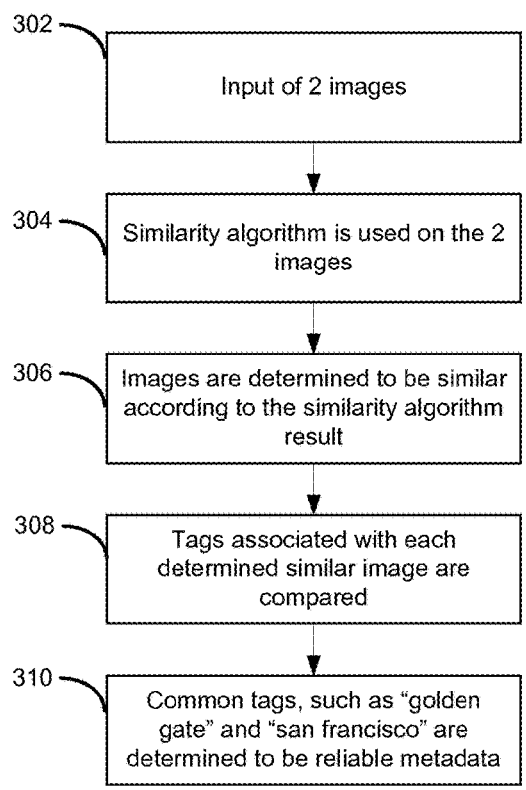
FIG. 3 illustrates a flowchart of an example according to embodiments of the invention.

As illustrated in the flowchart of FIG. 3, it is determined there is congruous metadata associated with images 200 and 210. The two images 200 and 210 are input for determining if the two images are similar 304.

The common metadata is determined to be congruous metadata in that the metadata accurately describes both images. The congruous metadata may be stored in a database, or flagged. In this way, the data vetted to be congruous may be available to be utilized in other functions.

Figure 4:
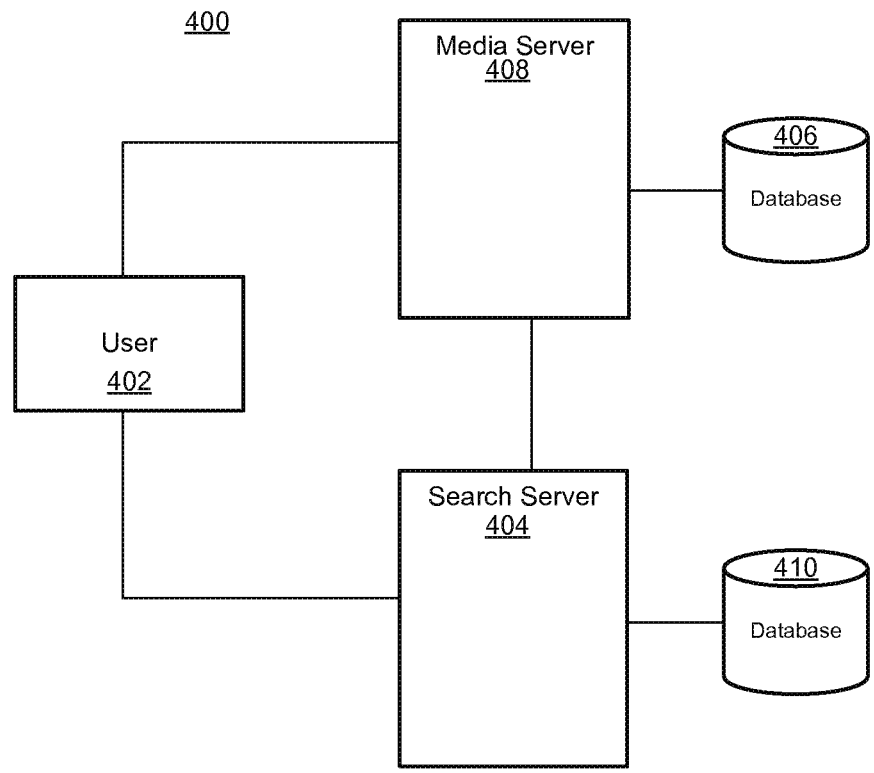
FIG. 4 illustrates a system for generating congruous metadata according to embodiments of the invention.

FIG. 4 illustrates a system for generating congruous metadata according to embodiments of the invention. The system 400 may include a search server 404 and a media server 408. A user 410 is provided congruous metadata from search server 404, or media server 408. A set of images that are to be used to generate congruous metadata may come from stored images from a media server 408, such as a digital photo sharing website. For example, a media server 408 may be a website such as Flickr. Other types of multimedia may be stored in the media server 408. The image similarity measure may be determined at a search server 404 or media server 408. The server 404 or media server 408 may also determine if the images are similar based on the similarity measure and a similarity threshold. Further, the server 404 or media server 408 may also compare the associated metadata of each the images for common associated metadata that can be determined as congruous metadata.

The search server 404 may also be associated with a database 410. The database 410 may store, among other things, congruous metadata associated with a multimedia object. Similarly, a media server may be associated with a database 406. The database 406 may store, among other things, congruous metadata associated with a multimedia object. Database 410 and database 406 may also store flags associated with the congruous metadata.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
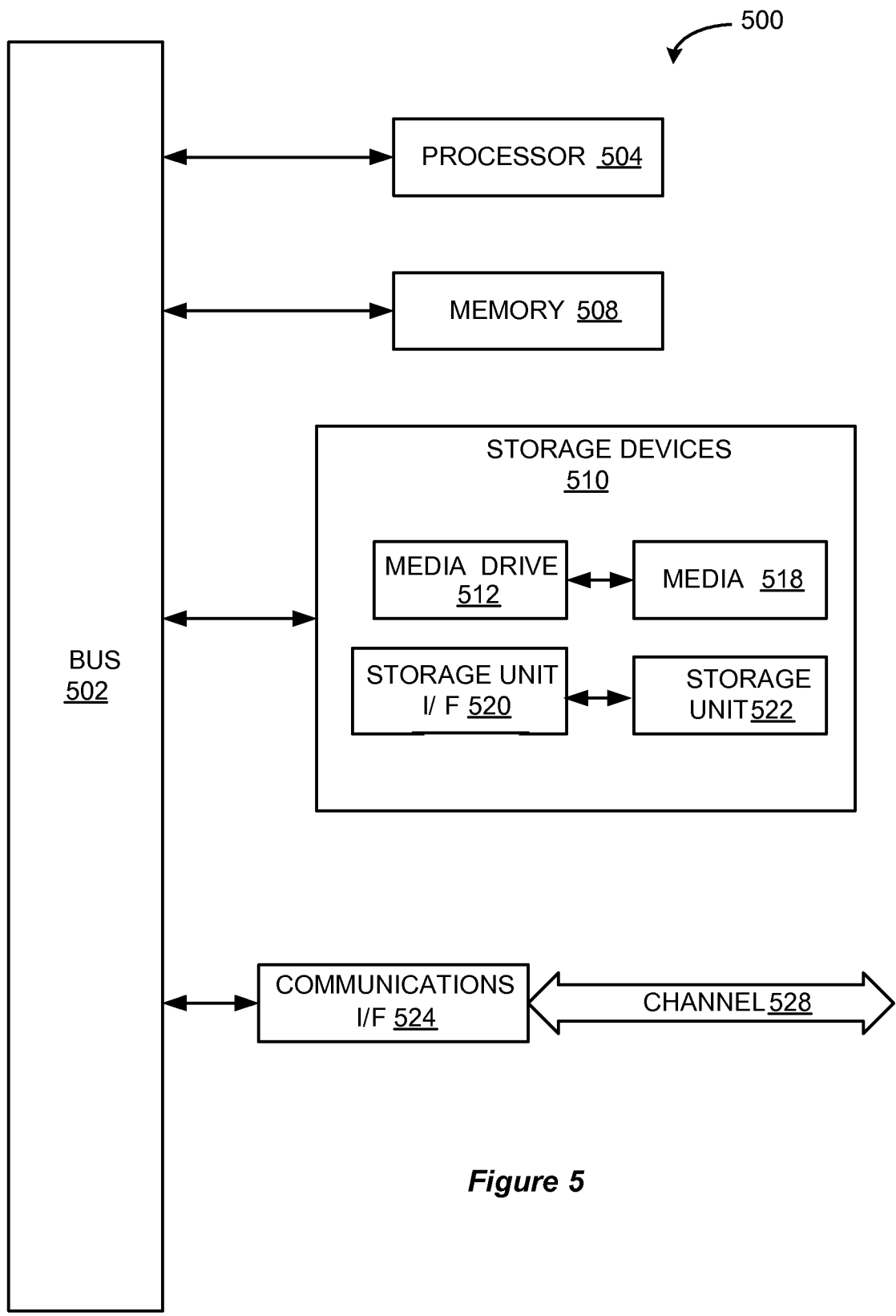
FIG. 5 illustrates a block diagram of a computing system according to embodiments of the invention.

FIG. 5 illustrates an exemplary computing system 500 that may be employed to implement processing functionality for various aspects of the invention (e.g., as a server device, client device, database, combinations thereof, and so on). Those skilled in the relevant art will also recognize how to implement the invention using other computer systems or architectures. Computing system 500 may represent, for example, a desktop, mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 424 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, storage unit 522, or signal(s) on channel 528.

These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
   determining, by a computing device of a multimedia system, a similarity between content of a first content item and content of a second content item, the determining comprising analyzing digital data of the first and second content items to determine the similarity;
   using, by the computing device, information indicating an absence of user verification of computer-generated congruous metadata to make a determination to dynamically adjust an adjustable similarity threshold configured for adjustment between being more or less restrictive;
   adjusting, by the computing device, in response to the determination, the adjustable similarity threshold to be more restrictive requiring a higher degree of similarity between the first and second content items in the absence of user verification of the computer-generated congruous metadata;
   determining, by the computing device, that the similarity determined for the first and second content items satisfies the adjustable similarity threshold;
   responsive to determining that the similarity satisfies the adjustable similarity threshold, comparing, by the computing device, a first set of metadata associated with the first content item with a second set of metadata associated with the second content item, the comparing comprising identifying metadata found in both the first and second sets of metadata;
   automatically generating, by the computing device, the congruous metadata comprising the identified metadata found in both the first and second sets of metadata; and
   in response to a retrieval request comprising at least some of the congruous metadata as selection criteria, retrieving, via the computing device and from a data store, at least one of the first and second content items.

2. The method of claim 1, further comprising:
   storing, by the computing device and in the data store, the congruous metadata, the storing comprising associating the congruous metadata with both the first and second content items.

3. The method of claim 1, determining a similarity between content of a first content item and content of a second content item further comprising:
   determining, for the first content item, a first set of content items similar to the first content item;
   determining, for the second content item, a second set of content items similar to the second content item;
   determining that the similarity of the first and second content items satisfies the similarity threshold if the first content item is included in the second set of content items similar to the second content item and the second content item is included in the first set of content items similar to the first content item.

4. The method of claim 3, further comprising:
   determining the first set of content items comprising using a similarity measure associated with each content item of the first set, the similarity measure associated with a content item of the first set indicating the similarity of the content item to the first content item; and
   determining the second set of content items comprising using a similarity measure associated with each content item of the second set, the similarity measure associated with a content item of the second set indicating the similarity of the content item to the second content item.

5. The method of claim 1, determining a similarity between content of a first content item and content of a second content item further comprising:
   determining a representation of the first content item using the content of the first content item;
   determining a representation of the second content item using the content of the second content item; and
   determining a difference between the representation of the first content item and the representation of the second content item.

6. The method of claim 5, the representation of the first content item and the representation of the second content item comprising a vector representation.

7. The method of claim 5, the representation of the first content item and the representation of the second content item comprising a video mosaic representation.

8. The method of claim 5, the representation of the first content item and the representation of the second content item comprising an audio waveform signal.

9. The method of claim 1, the identified metadata found in both the first and second sets of metadata used in automatically generating the congruous metadata comprising user-generated metadata found in both the first and second sets of metadata.

10. A non-transitory computer-readable storage medium tangibly encoded with computer-executable instructions that when executed by a processor associated with a computing device perform a method comprising:
   determining a similarity between content of a first content item and content of a second content item, the determining comprising analyzing digital data of the first and second content items to determine the similarity;
   using information indicating an absence of user verification of computer-generated congruous metadata to make a determination to dynamically adjust an adjustable similarity threshold configured for adjustment between being more or less restrictive;
   adjust, in response to the determination, the adjustable similarity threshold to be more restrictive requiring a higher degree of similarity between the first and second content items in the absence of user verification of the computer-generated congruous metadata;
   determining that the similarity determined for the first and second content items satisfies the adjustable similarity threshold;
   responsive to determining the similarity satisfies the adjustable similarity threshold, comparing a first set of metadata associated with the first content item with a second set of metadata associated with the second content item, the comparing comprising identifying metadata found in both the first and second sets of metadata;
   automatically generating the congruous metadata using the identified metadata found in both the first and second sets of metadata; and
   in response to a retrieval request comprising at least some of the congruous metadata as selection criteria, retrieving, from a data store, at least one of the first and second contents.

11. The non-transitory computer-readable storage medium of claim 10, determining a similarity between content of a first content item and content of a second content item further comprising:
   determining, for the first content item, a first set of content items similar to the first content item;
   determining, for the second content item, a second set of content items similar to the second content item;
   determining that the similarity of the first and second content items satisfies the similarity threshold if the first content item is included in the second set of content items similar to the second content item and the second content item is included in the first set of content items similar to the first content item.

12. The non-transitory computer-readable storage medium of claim 11, further comprising:
   determining the first set of content items comprising using a similarity measure associated with each content item of the first set, the similarity measure associated with a content item of the first set indicating the similarity of the content item to the first content item; and
   determining the second set of content items comprising using a similarity measure associated with each content item of the second set, the similarity measure associated with a content item of the second set indicating the similarity of the content item to the second content item.

13. The non-transitory computer-readable storage medium of claim 10, determining a similarity between content of a first content item and content of a second content item further comprising:
   determining a representation of the first content item using the content of the first content item;
   determining a representation of the second content item using the content of the second content item; and
   determining a difference between the representation of the first content item and the representation of the second content item.

14. The non-transitory computer-readable storage medium of claim 13, the first and second content items comprising image content and the representation of the first content item and the representation of the second content item comprising a vector representation.

15. The non-transitory computer-readable storage medium of claim 14, the first and second content items comprising video content and the representation of the first content item and the representation of the second content item comprising a video mosaic representation.

16. The non-transitory computer-readable storage medium of claim 14, the first and second content items comprising audio content and the representation of the first content item and the representation of the second content item comprising an audio waveform signal.

17. The non-transitory computer-readable storage medium of claim 14, the identified metadata found in both the first and second sets of metadata used in automatically generating the congruous metadata comprising user-generated metadata found in both the first and second sets of metadata.

18. A computing device comprising:
   a processor; and
   a non-transitory storage medium for tangibly storing thereon program logic for execution by the processor, the program logic comprising:
      determining logic executed by the processor for determining a similarity between content of a first content item and content of a second content item, the determining comprising analyzing digital data of the first and second content items to determine the similarity;
      using logic executed by the processor for using information indicating an absence of user verification of computer-generated congruous metadata to make an determination to dynamically adjust an adjustable similarity threshold configured for adjustment between being more or less restrictive;
      adjusting logic executed by the processor for adjust, in response to the determination, the adjustable similarity threshold to be more restrictive requiring a higher degree of similarity between the first and second content items in the absence of user verification of the computer-generated congruous metadata;

determining logic executed by the processor for determining that the similarity determined for the first and second content items satisfies the adjustable similarity threshold;

comparing logic executed by the processor for, responsive to determining the similarity satisfies the adjustable similarity threshold, comparing a first set of metadata associated with the first content item with a second set of metadata associated with the second content item, the comparing comprising identifying metadata found in both the first and second sets of metadata;

generating logic executed by the processor for automatically generating the congruous metadata using the identified metadata found in both the first and second sets of metadata; and in response to a retrieval request comprising at least some of the congruous metadata as selection criteria, retrieving, from a data store, at least one of the first and second contents.

* * * * *